Sept. 1, 1931.  G. O. LEOPOLD  1,821,841
SPIRAL SCREW DRIVER
Filed Oct. 16, 1930
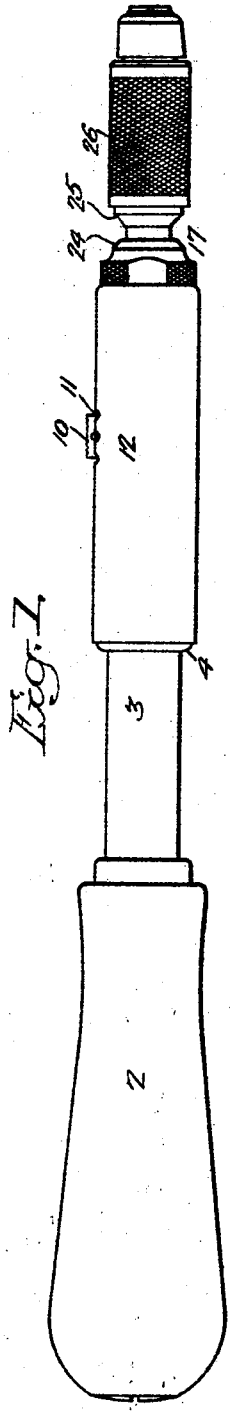
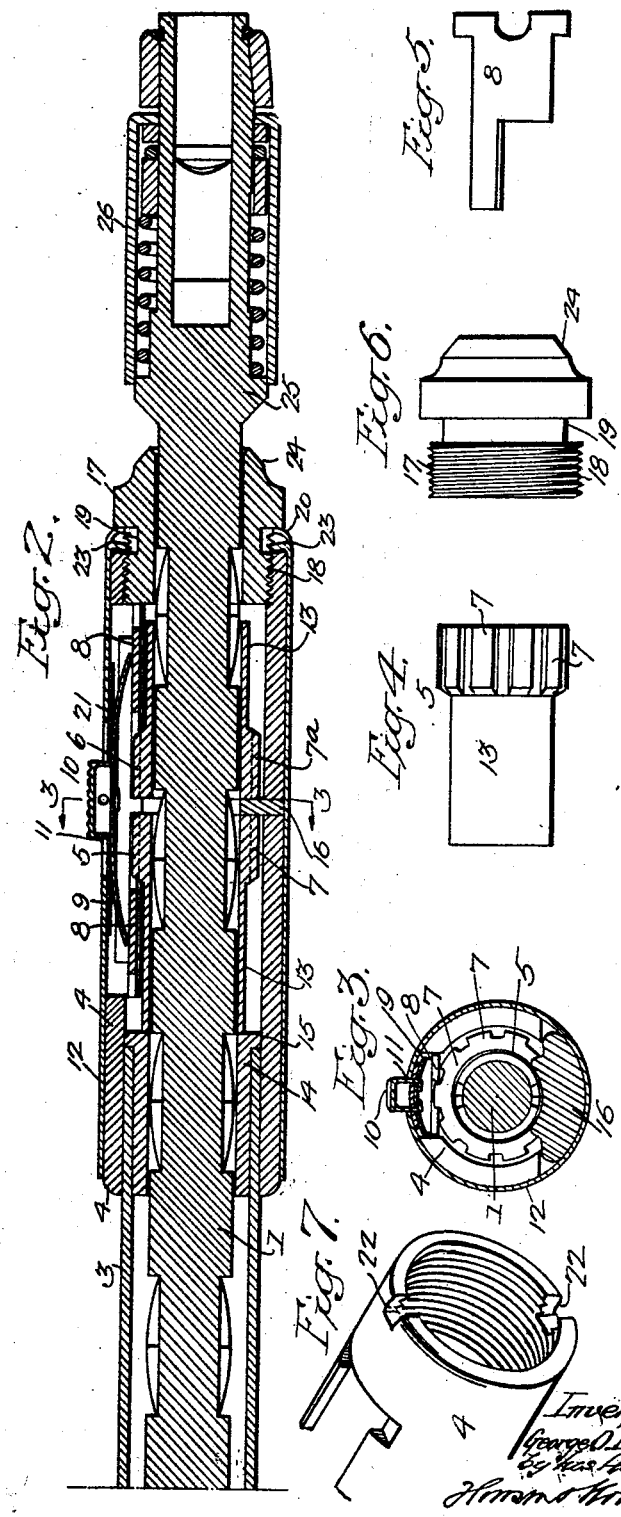
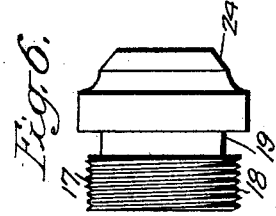
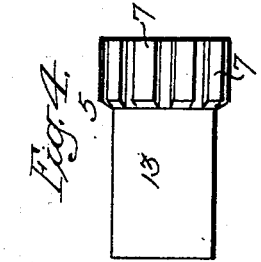
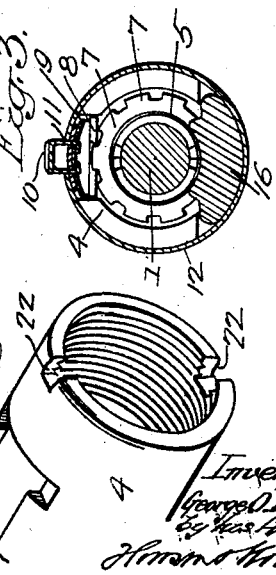
Inventor:
George O. Leopold Patented Sept. 1, 1931

1,821,841

UNITED STATES PATENT OFFICE

GEORGE O. LEOPOLD, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA

SPIRAL SCREW DRIVER

Application filed October 16, 1930. Serial No. 489,141.

My invention relates to certain improvements in spiral screw driving, of the type in which the spindle has a double spiral and the handle casing has a pawl and ratchet connection with nuts that control the movement of the spindle.

One object of the present invention is to so construct a screw driver of the above type that the parts can be readily assembled or the screw driver can be quickly taken apart for repairs without forwarding the driver to the factory which made the driver.

A further object is to so construct certain details of the driver that they will be more substantial than heretofore.

In the accompanying drawings:

Fig. 1 is a side view of my improved spiral screw driver;

Fig. 2 is a longitudinal sectional view of the screw driver, illustrating the pawl and ratchet mechanism;

Fig. 3 is a transverse sectional view on the line 3—3, Fig. 2;

Fig. 4 is a detached side view of on of the nuts;

Fig. 5 is a detached view of one of the pawls;

Fig. 6 is a detached view of the sleeve; and

Fig. 7 is a detached sectional view of one end of the casing.

The spindle 1 has a right and a left-hand spiral groove therein of the ordinary form. The handle 2 is secured to a tube 3 and this tube is firmly secured to a casing 4 in which are the right-hand nut 5 and the left-hand nut 6. Each nut has ratchet teeth 7 and 7a, respectively, which are engaged by pawls 8 of the type shown in Fig. 5. These pawls rock on the casing 4 and are controlled by a spring shifter 9, the ends of which bear upon the pawls as shown in Fig. 2. On the shifter is an operating portion 10 which projects through a slot 11 in a shell 12. By moving the shifter in one direction or the other, one pawl can be moved into engagement with its ratchet nut and the other raised clear of the nut, or vice versa, depending upon whether it is wished to turn the spindle to the right or to the left.

In this instance each nut has a long hub 13, and the internal screw-thread extends the full length of the hub, making the nut very substantial.

In the end of the tube 3 is a bushing 14 having a flange 15 which rests against the end of the tube. This bushing guides the inner end of the spindle and also acts as an abutment for the right-hand nut 5, the outer end of the nut being spaced from the nut 6 by a key 16 which extends through a slot in the casing 4 and is held in place by the shell 12 (see Fig. 3).

The left-hand nut 6 is located between the key 16 and a sleeve 17 at the end of the casing. The sleeve 17 has a screw-threaded portion 18 which engages an internal thread in the end of the casing 4, and has an annular groove 19 therein into which extends the inturned end 20 of the shell 12, locking the shell against longitudinal movement on the casing.

In order to hold the shell to the casing without screws, the end of the casing is notched at 22 as shown in Fig. 7. The shell, which has a turned-in flange, is held between the sleeve and the end of the casing, and portions 23 of the shell are bent into the notches of the casing which prevent it from turning.

The spring shifter 9 is made as follows: The shifter proper is a flat steel spring and is perforated for lugs on the operating portion 10 which is made of struck-up sheet metal, the prongs being bent under the flat spring so as to securely hold the portion 10 to the spring. Between the spring and the portion 10 is a cover plate 21 which slides with the shifter and covers the slot 11 in the shell 12 at all times.

The outer end 24 of the sleeve 17 is beveled as shown in Figs. 1 and 2 and the inner end of the enlargement 25 of the spindle is also beveled so that in the event of a user placing a finger in this point it will be pushed away by the beveled surfaces, preventing injury. The enlarged end 25 of the spindle forms the body of the chuck 26.

I claim:

1. The combination in a spiral screwdriver, of a spindle having right and lefthand threads thereon; a casing; a handle connected to the casing; two nuts mounted within the casing and through which the spindle extends; pawls engaging the nuts; a shifter for shifting the pawl, each nut having an extended hub, the internal threads in the nuts extending the full length of each nut; a flanged bushing at the inner end of the casing, the inner nut bearing against the bushing; a shell; a sleeve screwed into the casing; and means for securing the shell to the casing.

2. The combination in a spiral screw-driver, of a spindle having right and left-hand threads therein; a casing; a handle; a tube connecting the handle with the casing; a flanged bushing within the end of the tube and bearing against the end thereof; a sleeve secured to the outer end of the casing; right and left-hand nuts mounted between the bushing and the sleeve, said nuts having ratchet teeth; pawls arranged to engage the teeth; a shifter arranged to throw the pawls into and out of engagement with the ratchet teeth; and a shell enclosing the mechanism and having its outer end turned down over the end of the casing, said casing being notched to receive portions of the shell, so as to prevent it turning on the casing, the sleeve having an annular recess into which the turned-in end of the shell extends, so that the shell is locked against longitudinal movement as well as rotary movement.

GEORGE O. LEOPOLD.